(12) United States Patent
Petrovic

(10) Patent No.: US 7,159,709 B2
(45) Date of Patent: Jan. 9, 2007

(54) CONVEYOR BELT

(75) Inventor: Zmaj Petrovic, Mundolsheim (FR)

(73) Assignee: GEBO Industries, Societe Anonyme, Reichstett (FR)

( * ) Notice: Subject to any disclaimer, the term of this patent is extended or adjusted under 35 U.S.C. 154(b) by 29 days.

(21) Appl. No.: 10/517,752

(22) PCT Filed: Jul. 2, 2003

(86) PCT No.: PCT/FR03/02060

§ 371 (c)(1),
(2), (4) Date: Dec. 13, 2004

(87) PCT Pub. No.: WO2004/007320

PCT Pub. Date: Jan. 22, 2004

(65) Prior Publication Data

US 2005/0241922 A1    Nov. 3, 2005

(30) Foreign Application Priority Data

Jul. 5, 2002    (FR) .................................. 02 08468

(51) Int. Cl.
*B65G 17/06* (2006.01)
(52) U.S. Cl. .................................................... 198/852
(58) Field of Classification Search ................. 198/852
See application file for complete search history.

(56) References Cited

U.S. PATENT DOCUMENTS 4,682,687 A * 7/1987 Leege et al. ................ 198/852
5,174,439 A * 12/1992 Spangler et al. ............. 198/853
5,318,169 A * 6/1994 Faulkner et al. ............. 198/778
5,906,270 A * 5/1999 Faulkner ..................... 198/853
5,921,379 A    7/1999 Horton
6,036,001 A * 3/2000 Stebnicki et al. ............ 198/852
6,474,464 B1 * 11/2002 Horton et al. ............... 198/853
6,837,367 B1 * 1/2005 Klein et al. .................. 198/853

FOREIGN PATENT DOCUMENTS

| EP | 0 521 506 A | 1/1993 |
| EP | 0 878 418 A | 11/1998 |
| WO | WO 98 06648 A | 2/1998 |
| WO | WO 99 65801 A | 7/1999 |

* cited by examiner

*Primary Examiner*—Gene O. Crawford
*Assistant Examiner*—Mark A. Deuble
(74) *Attorney, Agent, or Firm*—Egbert Law Offices

(57) ABSTRACT

The planar conveyor belt is designed to move along curved trajectories and has a plurality of chain-links including, staggered at the fronts and at the rear of a central core, a succession of slots, each with an opening, in particular oblong in shape, so as to ensure play in a longitudinal direction of a chain-link relative to another adjacent chain-link. The conveyor belt is characterized in that at least on the side external to the curved trajectory it is designed to follow, at least some of the chain-links include, in their transverse extension, a chain-link modules providing, in particular across its slots a curvilinear contact zone with the pivot pins linking them.

6 Claims, 3 Drawing Sheets

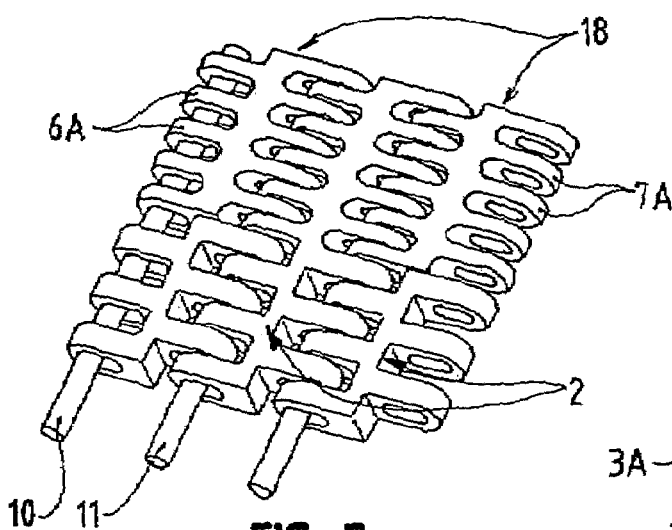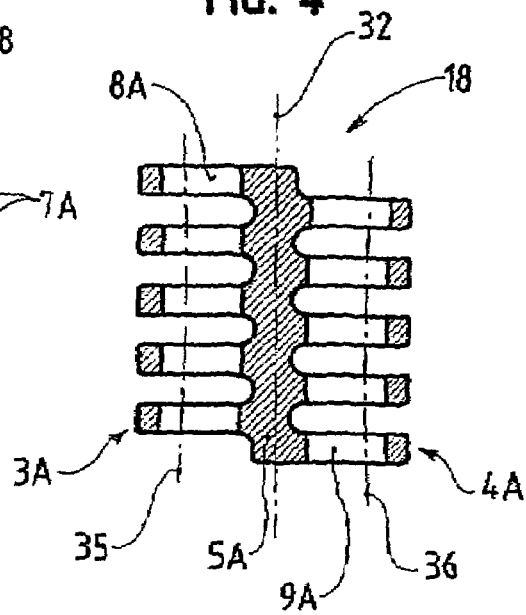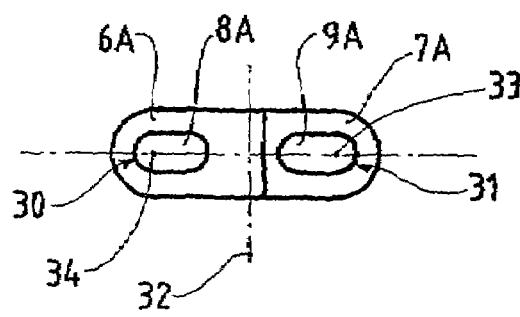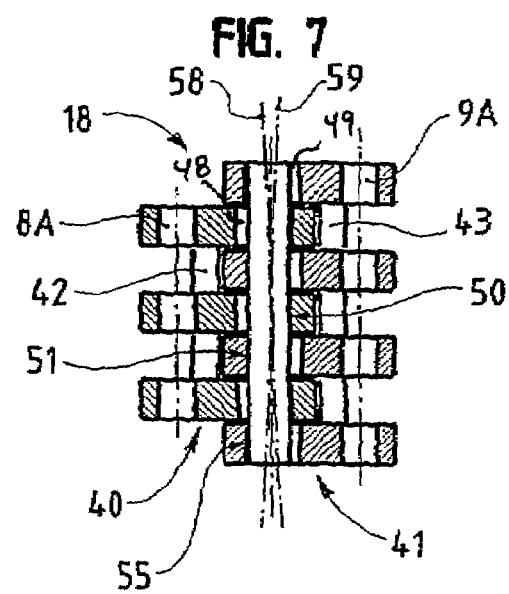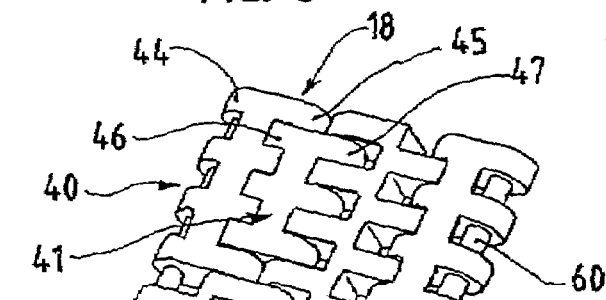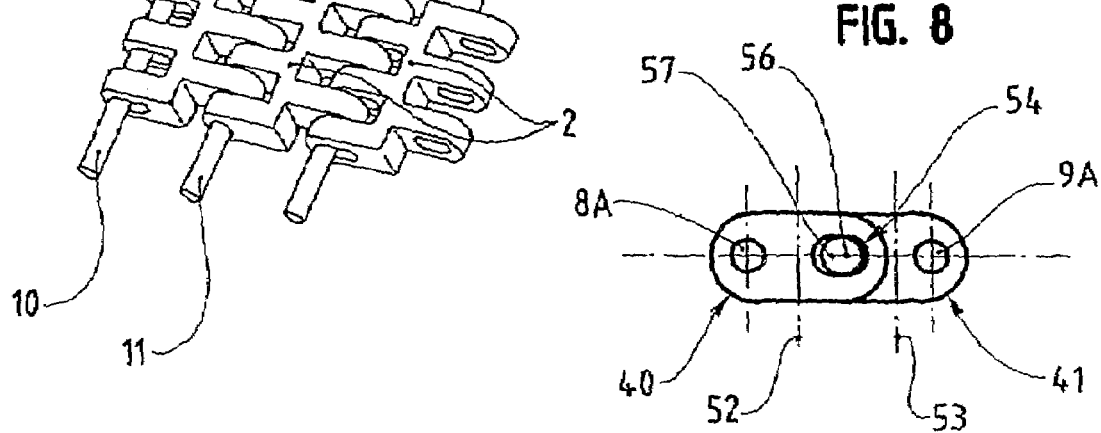

CONVEYOR BELT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a planar conveyor belts that are designed to move along curved trajectories. The present invention relates to planar conveyor belts having a plurality of chain links in which each of the chain links has a plurality of projections in staggered relationship on opposite sides of a central core. The chain links are connected together so as to follow the curved trajectory. The present invention also relates to the field of conveyance of objects of all kinds, such as containers.

BACKGROUND OF THE INVENTION

In the field of conveyance of containers, such as bottles, the conveyors that are most frequently used for transporting bottles through a bottling unit include pallet chains. These pallet chains describe closed circuits. The bottles will rest upon the upper sides of the pallet chains. These pallet chains can be juxtaposed together so as to define a conveyance plane.

The small width of the pallets that form these conveyors permits them to move along curved trajectories. The conventional pallet chain, which is usually formed of a stainless steel material, is particularly expensive. These pallet chains are often individually driven. Additionally, the speed differential between a chain within the curve and a chain that is located outside of the curve leads to a relative movement of the containers with respect to each other during a transport from a processing unit in one direction or another. This is not always desirable, for example, when less stable containers have to be conveyed.

As a result, there have been prior art conveyor belts that are better able to move, in a horizontal plane, along curved trajectories which include chain links that are hinged to one another extending over the entire width of the conveyor. These prior art chain links include, at the front and the rear, form a central core with a succession of staggered projections crossed by an opening for the passage of a pivot pin so as to assure the connection of two successive chain links. The openings of at least some of the slots at the front or those at the rear are oblong in shape in order to provide these chain-links with longitudinal mobility with respect to the other. This permits these chain-links to be brought closer to each other on the inner side of a bend of the conveyor belt. The traction that is imparted to the conveyor belt by the appropriate driving means is exerted from one chain link on the other along their length. In the curved portions, this traction force can only be reflected from one chain link to the following through the slots located outside of the bend. Since this traction force is concentrated at the outer edge of the conveyor belt in order to be transferred from one chain link to another through a single slot, this makes the belt particularly fragile. The width of the conveyor belt is necessarily limited. Additionally, it cannot have a bend of more than 90°.

In order to improve this situation, several solutions have been contemplated. One solution consists of attaching a reinforced module to the ends of each chain link. Although the chain-links are formed of plastic, the reinforcement modules are actually formed of metal. This solution does not completely solve the problem and the increases weight of the belt through these metal modules. These metal modules are relatively expensive and are generally unsatisfactory in use.

European Patent No. WO-98/06648 describes the use of pivot pin linking two successive chain links so as to form a conical shape at the end portions. The conicality can only fit a well-defined curve radius.

For conveyor belts having a smaller curved radii, the retransmission of the traction force occurs from one chain link onto the next chain link at a precise point on their length transverse to the axis of the belt. This retransmission of the traction force is carried out in a localized way by means of one or two of the slots of these chain links.

BRIEF SUMMARY OF THE INVENTION

In virtually all of the conveying installations, the conveyor belt moves along a curved trajectory in only a single direction with respect to the progression of the belt. In these installations, it is advantageous to create a solution that solves the prior art problems by improving the distribution of stresses as much as possible on one side or the other side of the conveyor belt. In particular, such stresses are on the side located externally with respect to the planned trajectory of the belt.

Additionally, the conveyor belt should be adapted to such a trajectory without respect to the relative mobility of the chain links with respect to each other. In the present invention, the chain links are usually mobile with respect to each other because of the oblong openings made in their slots and crossed by a pivot pin. The present invention includes a planar conveyor belt designed to move along curved trajectories and includes a plurality of chain links that have projections staggered on the front and the rear of a central core. Each of the projections has an opening for the passage of a transverse pivot pin so as to allow the connection between two successive chain links. At least some of the chain links include a chain link module that has projections provided with oblong openings. The center of the oblong openings are aligned so as to be generally parallel to the curved radius of the conveyor belt.

The present invention also is a planar conveyor belt that is designed to move along curved trajectories and includes a plurality of chain links that have a plurality of projections staggered with respect to each other at a front side and a rear side of a central core. Each of these projections has an oblong-shaped opening through which a transverse pivot pin extends. At least two intermediate chain links are interconnected between the plurality of chain links and also has suitable oblong openings which correspond to the oblong openings in the projections of the chain links.

The present invention is also a planar conveyor belt that includes a plurality of chain links each having a plurality of projections extending in staggered relationship at the front side and the rear side of a central core. The central core is defined by a pair of juxtaposed bars which carries front slots and rear slots through which the respective projections of the chain links extend.

The present invention relates to a planar conveyor belt that is designed to move along curved trajectories. The present invention relates to planar conveyor belts having a plurality of chain links in which each of the chain links has a plurality of projections in staggered relationship on opposite sides of a central core. The chain links are connected together so as to follow the curved trajectory. The present invention also relates to the field of conveyance of objects of all kinds, such as containers.

BRIEF DESCRIPTION OF THE SEVERAL VIEWS OF THE DRAWINGS

FIG. 3 is a top perspective view of the chain links of the planer conveyor belt of the present invention.

FIG. 4 is a cross-sectional view of a chain link module in accordance with the chain link arrangement of FIG. 3.

FIG. 5 is an end view of the chain link module of FIG. 4.

FIG. 6 is a perspective view of a first alternative embodiment of the chain links of the conveyor belt of the present invention.

FIG. 7 is a cross-sectional view of a chain link module that is used in the chain links of the conveyor belt of FIG. 6.

FIG. 8 is an end view of the chain link module as illustrated in FIG. 7.

DETAILED DESCRIPTION OF THE INVENTION

Figure 1:
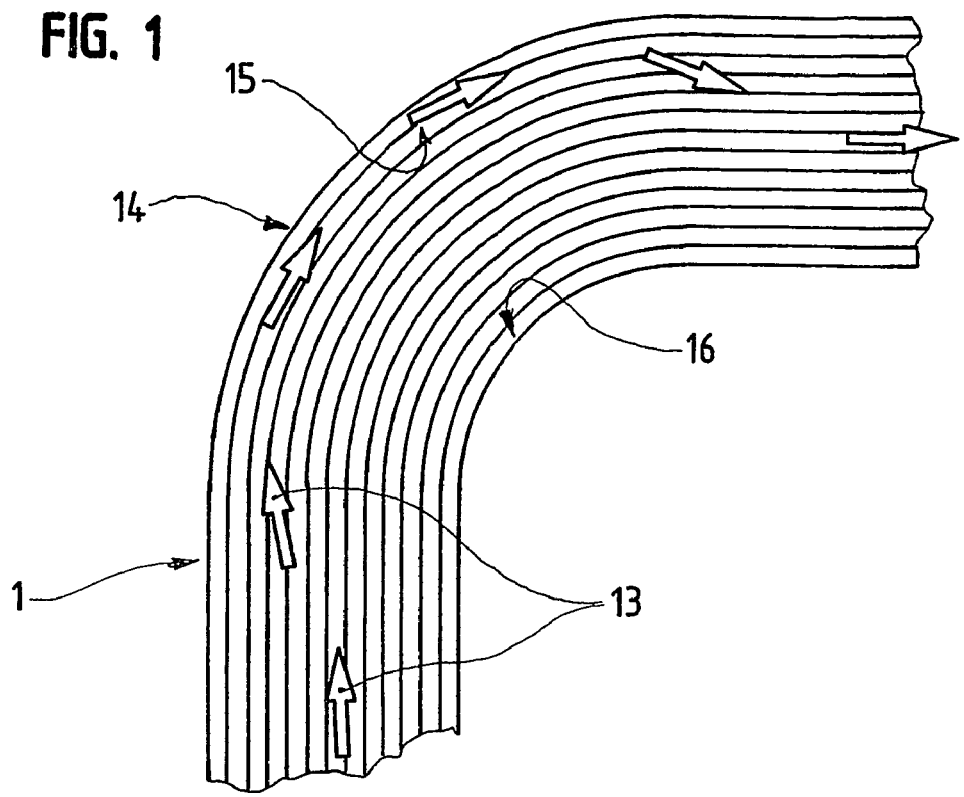
FIG. 1 is a planar view of a planar conveyor belt of the present invention for moving along a curved trajectory.
Figure 2:
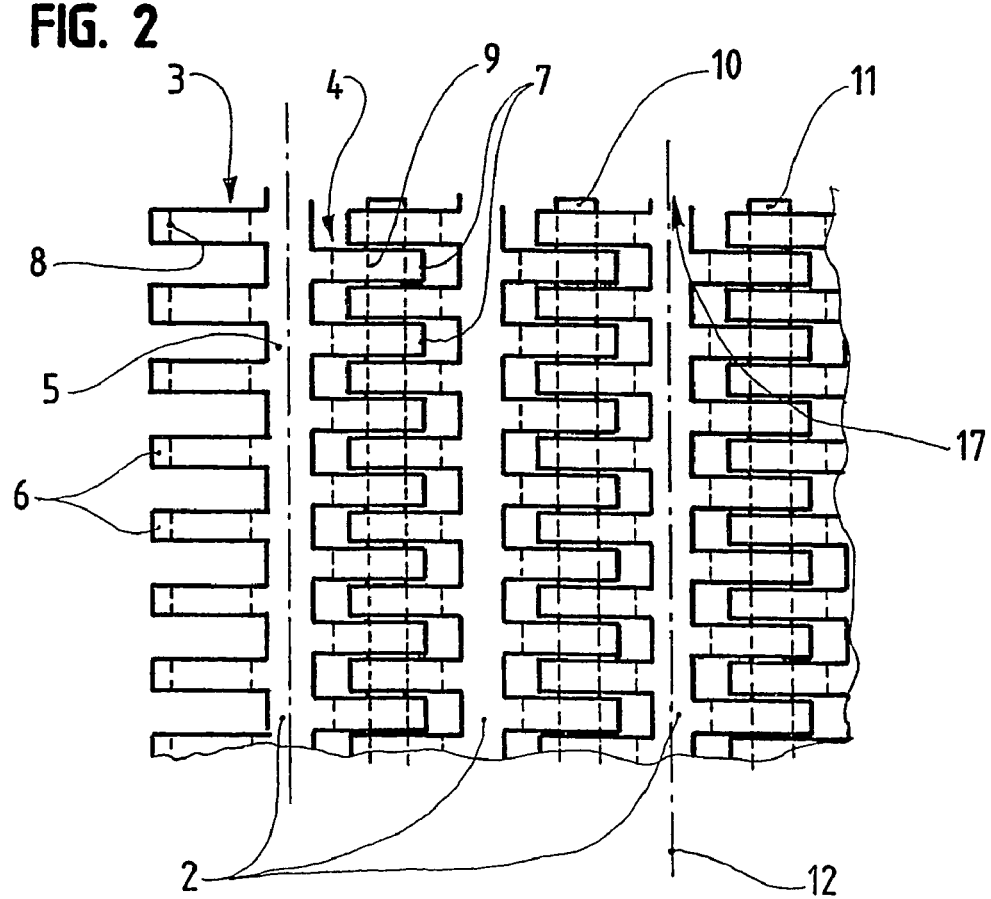
FIG. 2 is a schematic plan view of the conveyor belt in accordance with the present invention.
Figure 9:
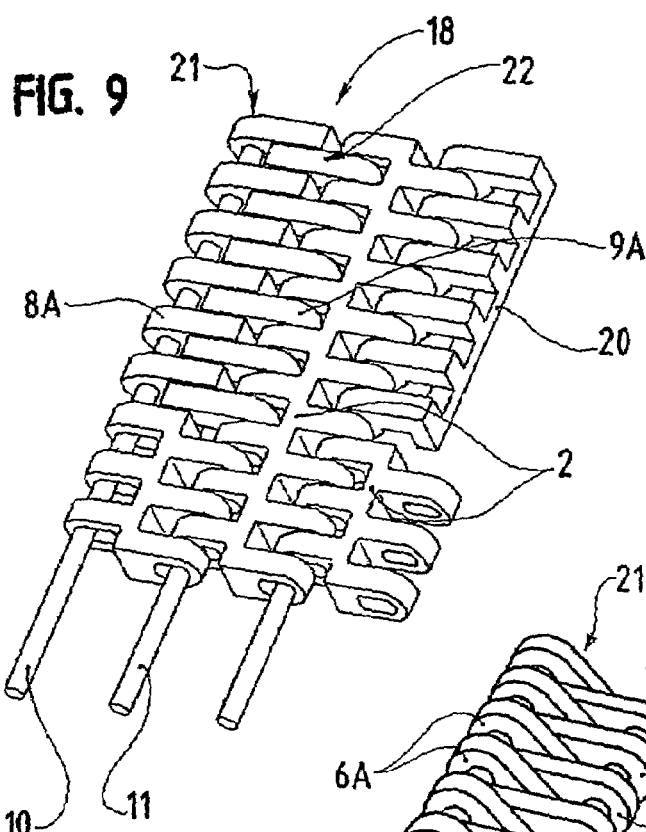
FIG. 9 is a top perspective view of the chain links of a conveyor belt in accordance with a second embodiment of the present invention.
Figure 10:
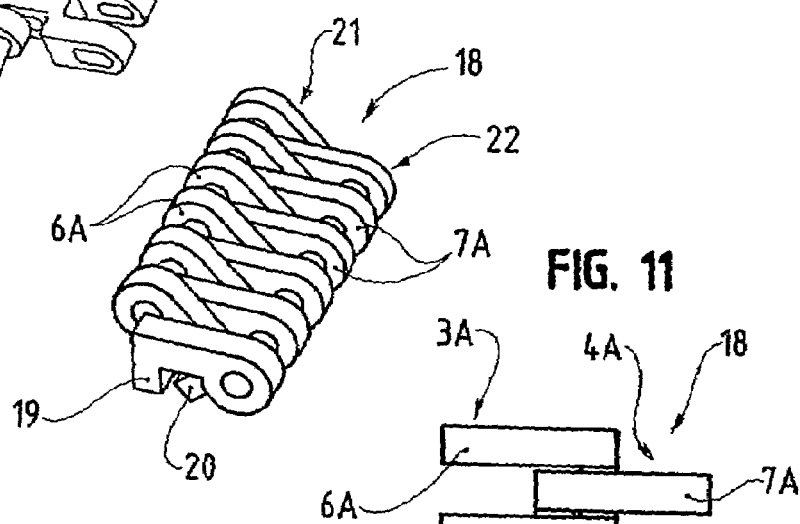
FIG. 10 is a schematic illustration of a chain link module of the second embodiment of the present invention.

Referring to FIG. 1, there is shown the planar conveyor belt 1 designed to move along curved trajectory. In FIG. 2, the conveyor belt 1 has a plurality of chain links 2 that are hinged to each other. Each of the chain links 2 includes a central core 5 having a front 3 and a rear 4. A plurality of projections 6 and 7 can extend at the front 3 and the rear 4, respectively, from the central core 5. Each of the projections 6 and 7 includes respective openings 8 and 9 for the passage of transfer pins 10 and 11 so as to assure the connection between two successive chain links 2. The openings 8 and 9 of the projections 6 in the front 3 and the projections 7 in the rear 4 are each oblong in shape in a direction perpendicular to the median plan 12 of the chain link 2 so as to ensure proper movement of the chain link 2 with respect to an adjacent chain link longitudinally with respect to the belt 1.

In FIG. 1, it can be seen that conveyance line traction force are exerted on the belt 1 in the form of arrows 13. These conveyance line traction forces are also exerted on the outside of the belt 1. In the past, it was necessary to reinforce the corresponding lateral side 15 of the conveyor belt 1. However, since on virtually all of the conveyance lines bend only in a single direction, it is not necessary to reinforce each of the lateral sides 15. This reinforcement consists in attaching, in the transverse extension of at least several of these chain links 2, in particular, at the other end 17 of the conveyor belt, a reinforcing chain link module 18, as shown in the various embodiments illustrated in FIGS. 3–12. These chain link modules can be independent or can be an integral part of the chain links 2. The chain link modules include staggered series of projections 6A and 7A at the front 3A and at the rear 4A. The number of projections can be varied. Each of the projections 6A and 7A include respective openings 8A and 9A for the passage of the pivot pins 10 and 11, respectively.

According to the preferred embodiment of the present invention, as shown in FIGS. 3–5, the openings 8A and 9A are oblong in shape at least on the most external side 30 and 31 with respect to the median plane 32 of the chain link module. The openings 8A and 9A have a center 34 of a semicircular sector 33 which is located on axes 35 and 36 that are convex and extend in generally parallel relationship to the curved radius of the conveyor belt. This curved radius should exceed one meter.

In the first alternative embodiment, as shown in FIGS. 6–8, the chain link module includes at least two intermediate chain links 40 and 41. These intermediate chain link 40 has a central core 42 with projections 44 extending on a front side thereof and a projections 45 extending from a rear side thereof. The intermediate chain link 41 has a central core 43 with projections 46 extending from a front side thereof and projections 47 extending a rear side thereof. The projections 44 and 47 are provided with openings 8A and 9A that are adapted to the cylindrical cross section of the pivot pins 10 and 11 extending through them. The projections 45 and 46 are provided with oblong openings 48 and 49 which extend on the most distant sides 50 and 51 relative to the median planes 52 and 53 of the respective chain links 40 and 41. Semicircular sectors 54 and 55 have a respective center 56 and 57 which is located on respective axes 58 and 59 that correspond to the curve radius of the conveyor belt. This curved radius should exceed one meter relative to the respective median plane 52 and 53. These oblong openings are crossed by an intermediate pivot pin 60.

Figure 11:
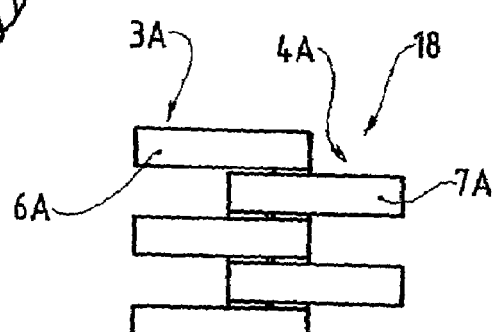
FIG. 11 is a plan view of the chain link module as shown in FIG. 10.
Figure 12:
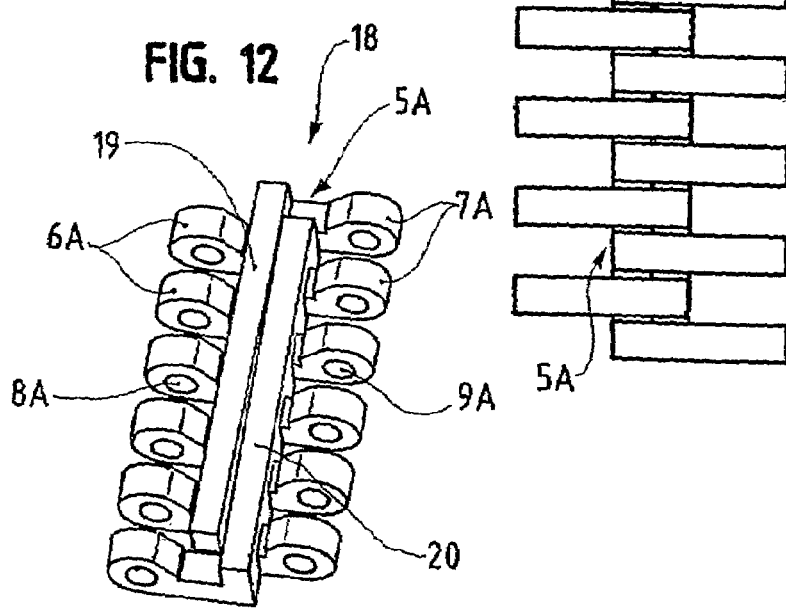
FIG. 12 is a perspective bottom view of the chain link module of the second alternative embodiment of the present invention.

In a second alternative embodiment of the present invention, the projections 8A and 9A at the front 6A and rear 7A of the chain link are particularly adapted to the cross-section of the respective pins 10 and 11 that link the chain links 2. These projections 6A and 7A are mounted exclusively so as to pivot on these pins. The chain link module includes a central core 5A that is defined by two juxtaposed bars 19 and 20. The front bar 19 carries the rear projection 7A. The rear bar 20 carries the front projection 6A. The chain link module in accordance with the alternative embodiment illustrates in FIGS. 10–12 includes two basic portions 21 and 22 that are designed to be fitted into each in accordance with the arrangement illustrated in FIG. 10. The front projections 6A are inserted from the bottom between the rear projections 7A in order to be pushed into the front 3A so that the bar 20 carrying these front slots 6A is juxtaposed at the rear of the bar 19 carrying the rear projection 7A. The length of the projections 6A and 7A are defined so as to give to the basic portions 21 and 22 of a chain link module a relative mobility in a direction perpendicular to its longitudinal median plane, i.e. in the longitudinal direction of the conveyor belt 1. The bars 19 and 20 are designed so as to face each other. The bars 19 and 20 are of convex shape having a considerable curve radius, exceeding one meter. This curved radius is preferably in the order of three meters. As shown in FIG. 11, since the two basic portions 21 and 22 are moved apart from each other as far as possible, this will correspond to the curved trajectory followed by the conveyor belt 1. The bars 19 and 20 lean on each other in side-by-side relationship according to the zone extending on a length corresponding to the projections 6A and 7A in order to distribute the traction load exerted on the conveyor belt 1. This results from the size of the curve radius on the convex side and from the elastic distortion under the action of this traction force exerted on the conveyor belt 1. This is the same principle that has been applied in previous embodiments of the present invention.

Because of the arrangement and distribution of traction loads on the chain links of the conveyor belt, it is possible to manufacture the respective chain link modules out of a synthetic material. As such, the chain link modules can be made out of the same material as the chain links themselves.

The present invention advantageously solves the problems of the prior art. The present invention gives an increase of the mechanical strength of the conveyor belt 1. The present invention can follow curvatures exceeding 90°. As such, the present invention can be utilized where it is necessary to use two separate conveyor belts in the prior art with separate driving means for each of the conveyor belts.

The chain link modules of the present invention are not necessarily provided on each chain link of the belt. The chain link modules can have different lengths in order to create a nesting so as to prevent them from escaping from the major chain links when they are not an integral part of the chain links.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A planar conveyor belt for moving along a curved trajectory, the conveyor belt comprising:
    a plurality of chain links having a central core with a front and a rear, said plurality of chain links having a plurality of projections in a staggered arrangement at said front and said rear, said projections at said front having aligned openings, said plurality of projections of said rear having aligned openings, each of said openings at said front and said rear having an oblong shape;
    a first pivot pin passing through said aligned openings of said projections at said front; and
    a second pivot pin passing through said aligned openings of said plurality of projections at said rear, each of said openings having a center positioned on an axis extending in generally parallel relation to the curved trajectory, said axis having a radius in excess of one meter.

2. A planar conveyor belt for moving along a curved trajectory comprising:
    a first plurality of chain links having a central core with a front and a rear, said first plurality of chain links having a first plurality of projections in spaced relation to each other at said front and a second plurality of projections in spaced relation to each other at said rear, said first and second plurality of projections being in staggered relation to each other, said first plurality of projections having aligned openings, said second plurality of projections having aligned openings, each of said aligned openings being of an oblong shape;
    a second plurality of chain links having a central core with a front and a rear, said second plurality of chain links having a first plurality of projections in spaced relation to each other at said front and a second plurality of projections in spaced relation to each other at said rear, said first and second plurality of projections of said second plurality of chain links being in staggered relation to each other, said first plurality of projections of said second plurality of chain links having aligned openings, said second plurality of projections of said second plurality of chain links having aligned openings, each of said aligned openings of said second plurality of chain links being of an oblong shape, said second plurality of projections at said rear of said second plurality of chain links being sandwiched between at least some of said first plurality of projections of said first plurality of chain links;
    a plurality of intermediate chain links having a central core with a front and a rear, said plurality of intermediate chain links having a first plurality of projections in spaced relation to each other at said front and a second plurality of projections in spaced relation to each other at said rear, said first and second plurality of projections of said plurality of intermediate chain links being in staggered relation to each other, said first plurality of projections of said plurality of intermediate chain links having aligned openings, said second plurality of projections having aligned openings, each of said aligned openings of said plurality of intermediate chain links being of an oblong shape, said second plurality of projections at said rear of said plurality of intermediate chain links sandwiched between at least some of said first plurality of projections of said first plurality of chain links, said first plurality of projections of said plurality of intermediate links sandwiched between at least some of said second plurality of projections at said rear of said second plurality of chain links;
    a first pin extending through said openings in said first plurality of projections of said second plurality of chain links; and
    a second pin extending through said openings in said second plurality of projections of said second plurality of chain links and through said openings of said first plurality of projections of said first chain link and through said second plurality of projections of said plurality of intermediate chain links, each of said openings having a center positioned on an axis extending in generally parallel relationship to the curved trajectory, said axis having a radius in excess of one meter.

3. A planar conveyor belt for moving along a curved trajectory comprising:
    a plurality of chain links having a central core with a front and a rear, said plurality of chain links having a plurality of projections extending outwardly of said central core in spaced relation at said front and a plurality of projections extending outwardly of said central core in spaced relation at said rear, said first plurality of projections at said front and said plurality of projections at said rear being in staggered relationship to each other, said projections at said front having aligned openings, said projections at said rear having aligned openings, each of said openings at said front and said rear having a circular shape, said core comprising two juxtaposed bars in which a front bar of said two juxtaposed bars carries a plurality of rear slots and a rear bar of said two juxtaposed bars carries a plurality of front slots, said plurality of projections extending through said front slots and said rear slots;

a first pin passing through said aligned openings of said plurality of projections at said front; and a second pivot pin passing through said aligned openings of said plurality of projections at said rear, each of said openings having a center positioned on an axis extending in generally parallel relationship to the curved trajectory, said axis having a radius in excess of one meter.

4. The conveyor belt of claim 3, each of said front slots and said rear slots defining a space suitable for allowing the respective projections to move therein from one side to another side of the slot.

5. The conveyor belt of claim 3, said radius being of approximate three meters.

6. The conveyor belt of claim 3, each of said chain links being formed of a polymeric material.

* * * * *